(12) United States Patent
Kim et al.

(10) Patent No.: US 10,105,943 B2
(45) Date of Patent: Oct. 23, 2018

(54) LAMINATION APPARATUS AND LAMINATION METHOD USING THE SAME

(71) Applicant: SAMSUNG ELECTRONICS CO., LTD., Suwon-si, Gyeonggi-do (KR)

(72) Inventors: Do Hyung Kim, Seoul (KR); Dong-Hee Han, Suwon-si (KR); Do-Wan Kim, Suwon-si (KR); Byeong-Cheol Kim, Suwon-si (KR); Hak Rae Kim, Suwon-si (KR); Jung Hun Sung, Suwon-si (KR); Sung-Gwan Woo, Hwaseong-si (KR); Kyung Woon Jang, Seoul (KR); Chang Kyu Chung, Suwon-si (KR); Kyoung Hern Hong, Suwon-si (KR); Sung-Ju Hwang, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 183 days.

(21) Appl. No.: 15/139,996

(22) Filed: Apr. 27, 2016

(65) Prior Publication Data

US 2016/0318293 A1 Nov. 3, 2016

(30) Foreign Application Priority Data

Apr. 28, 2015 (KR) .................. 10-2015-0059613

(51) Int. Cl.
   *B32B 38/18* (2006.01)
   *B32B 37/12* (2006.01)
   *G02F 1/13* (2006.01)

(52) U.S. Cl.
   CPC ...... *B32B 38/1866* (2013.01); *B32B 38/1841* (2013.01); *B32B 37/12* (2013.01);
   (Continued)

(58) Field of Classification Search
   CPC .......... B32B 2457/20; B32B 2457/202; B32B 2457/208; B32B 38/1866; G02F 1/1303;
   (Continued)

(56) References Cited

U.S. PATENT DOCUMENTS

2014/0002975 A1* 1/2014 Lee .................. H05K 5/0017
                                                         361/679.01
2014/0345792 A1* 11/2014 Lee .................. B32B 37/0046
                                                              156/228

(Continued)

FOREIGN PATENT DOCUMENTS

KR   10-2009-0014475 A    2/2009
KR   10-2013-0005620      1/2013
(Continued)

OTHER PUBLICATIONS

Korean Office Action dated Nov. 18, 2016 in corresponding Korean Patent Application No. 10-2015-0059613 (7 pages) (6 pages English Translation).

(Continued)

*Primary Examiner* — Carson Gross
(74) *Attorney, Agent, or Firm* — Staas & Halsey LLP (57) ABSTRACT

Disclosed herein are a lamination apparatus which adheres substrates to a cover window having a curved surface and a lamination method using the same. The lamination apparatus includes a first jig on which a cover window is mounted, wherein a curved surface portion is formed in the cover window and a curvature center thereof is positioned behind the curved surface portion, a second jig on which a guide member is seated, wherein a substrate is mounted on the guide member and the guide member has a width greater than that of the substrate, and an interference member provided to interfere with both facing front surfaces of the guide member, wherein the interference member interferes with the guide member and the guide member is bent when the second jig approaches the first jig.

11 Claims, 11 Drawing Sheets

(52) U.S. Cl.
CPC ....... *B32B 2309/68* (2013.01); *B32B 2457/20* (2013.01); *G02F 1/1303* (2013.01); *Y10T 156/1002* (2015.01); *Y10T 156/1028* (2015.01)

(58) Field of Classification Search
CPC ........ Y10T 156/1002; Y10T 156/1028; B29K 2105/0079
USPC ................................................ 156/228, 475
See application file for complete search history.

(56) References Cited

U.S. PATENT DOCUMENTS

2017/0265340 A1* 9/2017 Son ...................... H05K 5/0017
2018/0056638 A1* 3/2018 Choi ..................... B32B 37/003

FOREIGN PATENT DOCUMENTS

| KR | 10-2013-0013103 | 5/2013 |
| KR | 10-2014-0139361 | 12/2014 |
| KR | 10-2014-0139361 A | 12/2014 |
| KR | 10-2015-0038449 | 4/2015 |

OTHER PUBLICATIONS

Korean Office Action dated Mar. 20, 2017 in corresponding Korean Patent Application No. 10-2015-0059613.
Korean Office Action dated May 12, 2017 in corresponding Korean Patent Application No. 10-2015-0059613.
Korean Notice of Allowance dated Jul. 25, 2017 in Korean Patent Application No. 10-2015-0059613.

* cited by examiner

LAMINATION APPARATUS AND LAMINATION METHOD USING THE SAME

CROSS-REFERENCE TO RELATED APPLICATIONS

This application claims the benefit of Korean Patent Application No. 10-2015-0059613, filed on Apr. 28, 2015 in the Korean Intellectual Property Office, the disclosure of which is incorporated herein by reference.

BACKGROUND

1. Field

Embodiments of the present disclosure relate to an apparatus for laminating display substrates and a lamination method using the same.

2. Description of the Related Art

In general, a display device is a device which visually displays data information such as characters and figures. The display device includes a liquid crystal display (LCD) and a frame on which the LCD is mounted. Because the LCD is a passive optical device which cannot emit light by itself, images can be displayed using a backlight assembly attached to a rear surface of a display panel.

The display device includes a display panel on which an image is formed, a source printed circuit board (PCB) for controlling the display panel, and a flexible PCB which connects the display panel to the source PCB. A bottom chassis in which a backlight unit is positioned may be provided at a rear of the display panel. The display device may further include a touch sensor panel to operate the display device by touching images displayed on the display device.

A cover window which forms a window may be provided in front of the display device. A printed film which forms a front exterior of the display device may be positioned at a rear surface of the cover window. Each of the substrates such as the display panel and the touch sensor panel may be adhered to the rear surface of the cover window by a transparent adhesion means and the like.

Recently, a curved display device in which a curvature of at least a part of the display panel changes has been used. The cover window is provided to have a curved surface to correspond to a shape of the curved display device, and the printed film, the touch sensor panel, the display panel, and the like may be adhered to the rear surface of the cover window.

According to a conventional lamination apparatus, the transparent adhesion means may be swept or bubbles may be generated between the substrate and the cover window due to the curved shape of the cover window when the substrate is adhered to the rear surface of the cover window. A cosmetic defect of the display device may occur and image quality may be degraded when the adhesion means is swept or the bubbles are generated.

SUMMARY

Therefore, it is an aspect of the present disclosure to provide a lamination apparatus for adhering substrates to a curved cover window and a lamination method using the same.

Additional aspects of the invention will be set forth in part in the description which follows and, in part, will be obvious from the description, or may be learned by practice of the invention.

In accordance with one aspect of the present disclosure, a lamination apparatus includes: a first jig to mount a cover window thereon, wherein the cover window includes a curved surface portion and a curvature center of the cover window is positioned behind the curved surface portion; a second jig to seat a guide member thereon, wherein a substrate is mounted on the guide member and the guide member has a width greater than a width of the substrate; and an interference member to interfere with opposite front surfaces of the guide member, wherein when the second jig approaches the first jig, the interference member interferes with the guide member and the guide member is bent due to the interference.

As the guide member is bent, the substrate may be bent together with the guide member.

The substrate may be bent to have a curvature greater than a curvature of the curved surface portion to prevent the curved surface portion of the cover window from interfering with the substrate.

The second jig may approach the first jig in a state in which the interference member interferes with the guide member.

The interference member may move away from the guide member when the substrate comes in contact with a rear surface of the cover window.

The entire substrate may come into close contact with the rear surface of the cover window when the interference member moves away from the guide member.

The first jig and the second jig allow the substrate to adhere to the rear surface of the cover window after the interference member moves away from the guide member.

A seating surface corresponding to a front outer surface of the cover window is formed at the first jig.

One surface of the second jig may be formed to correspond to a shape of an inner surface of the cover window.

The first jig may be provided to be lowered by a driving portion.

The second jig may be provided to be raised by a driving portion.

In accordance with one aspect of the present disclosure, a lamination method includes: mounting a substrate on a guide member having a width greater than a width of the substrate; mounting a cover window on a first jig, wherein the cover window includes a curved surface portion and a curvature center of the cover window is positioned behind the curved surface portion; seating the guide member, on which the substrate is mounted, on the second jig; allowing the first jig and the second jig to approach each other; allowing an interference member to interfere with opposite sides of the guide member; and allowing the substrate to adhere to a rear surface of the cover window.

The lamination method may further include separating the guide member from the substrate after the substrate adheres to the rear surface of the cover window.

The guide member and the substrate may be bent when the interference member interferes with the guide member.

The substrate may be bent to have a curvature greater than a curvature of the curved surface portion.

The lamination method may further include positioning an adhesion layer on a front surface of the substrate after the substrate is mounted on the guide member.

The positioning of the adhesion layer on the front surface of the substrate may include coating the front surface of the substrate with a transparent adhesive.

The lamination method may further include positioning an adhesion layer between the substrate and the guide member to fix the substrate on the guide member.

The lamination method may further include a spreading solution to dissolve the adhesion layer provided between the substrate and the guide member after the substrate adheres to the rear surface of the cover window.

The lamination method may further include separating the interference member from the guide member after a part of the substrate comes into contact with the rear surface of the cover window.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Reference will now be made in detail to the embodiments of the present disclosure, examples of which are illustrated in the accompanying drawings, wherein like reference numerals refer to like elements throughout.

Hereinafter, a lamination apparatus and a lamination method using the same according to one embodiment of the present disclosure will be described in detail with reference to the accompanying drawings.

Figure 1A:
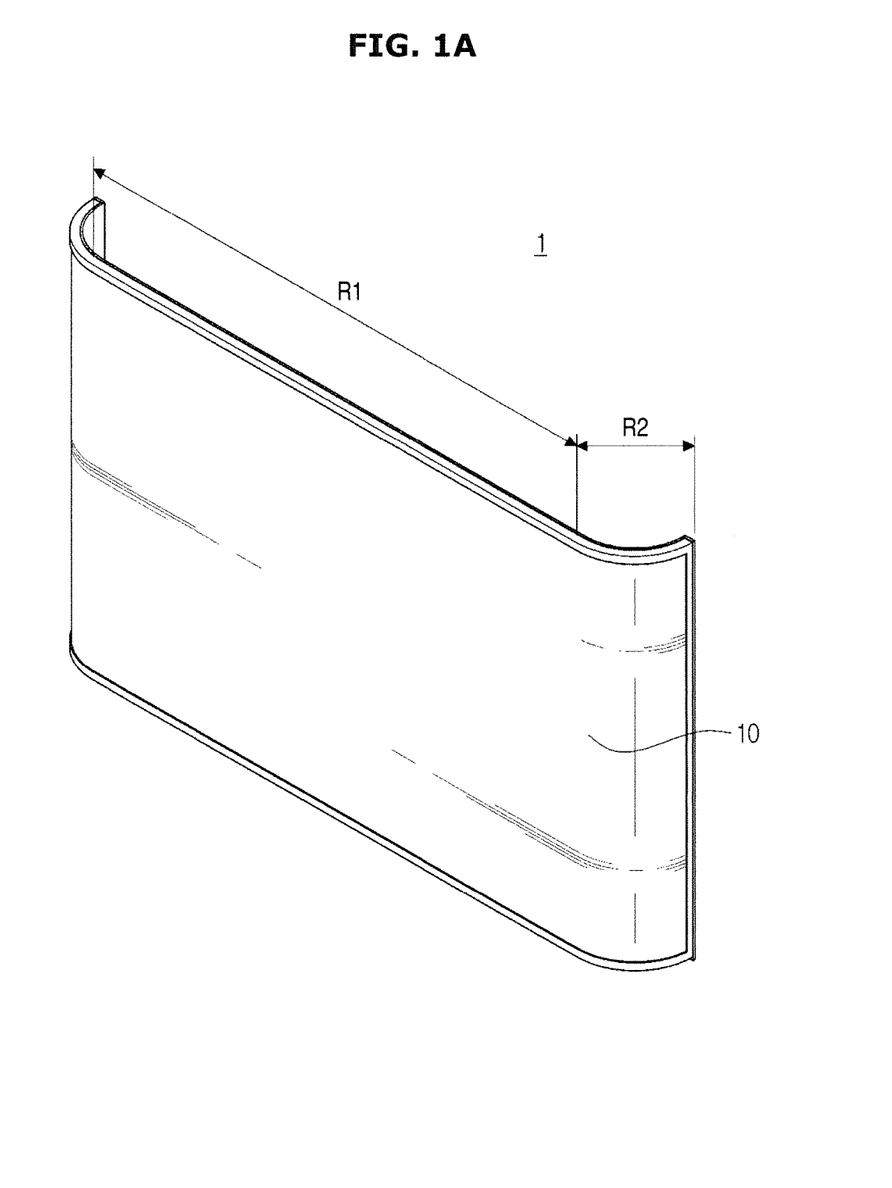
FIGS. 1A and 1B are views illustrating a display device according to one embodiment of the present disclosure.
Figure 1B:
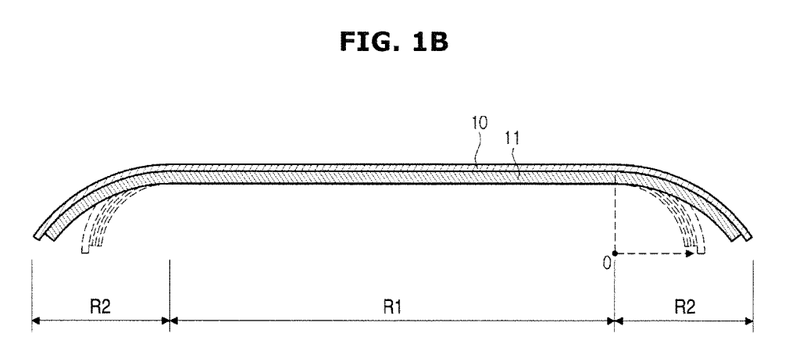
Figure 2A:
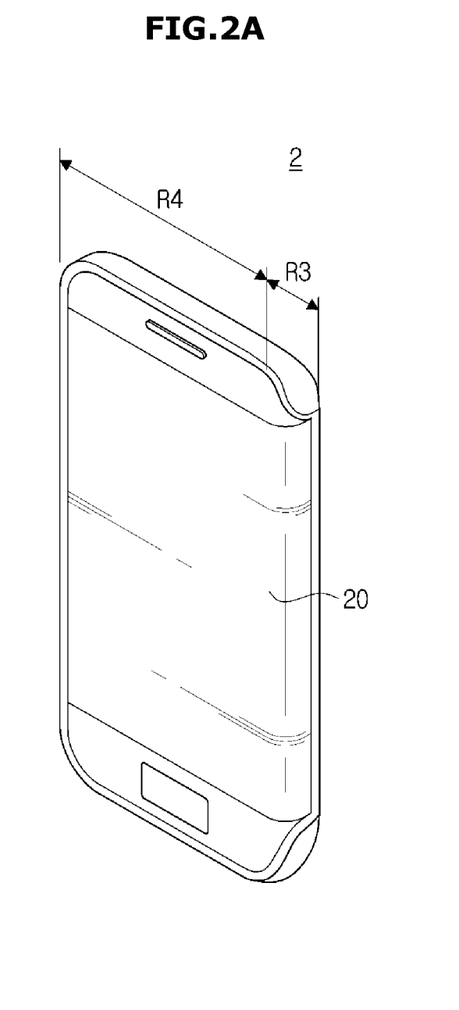
FIGS. 2A and 2B are views illustrating a terminal according to one embodiment of the present disclosure.
Figure 2B:
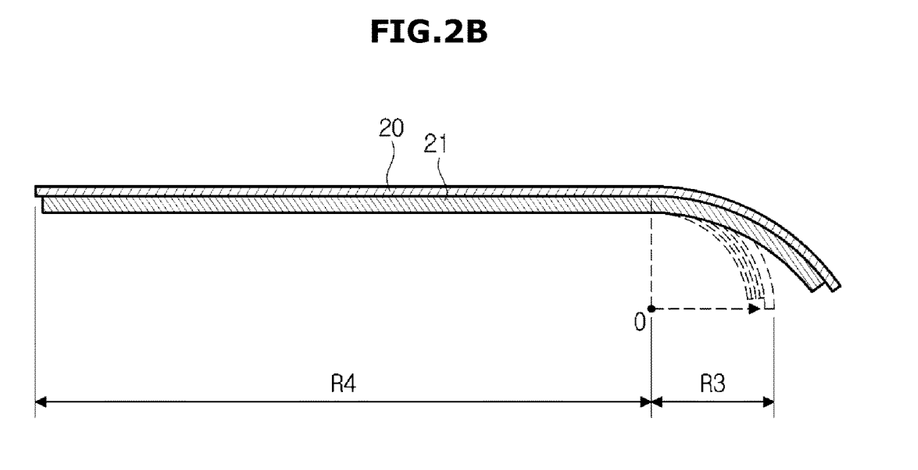

FIGS. 1A and 1B are views illustrating a display device according to one embodiment of the present disclosure, and FIGS. 2A and 2B are views illustrating a terminal according to one embodiment of the present disclosure.

Referring to FIGS. 1A to 2B, display devices 1 and 2 according to embodiments of the present disclosure may be formed to have a curved surface in which at least a part thereof has a predetermined curvature. An entirety of each of the display devices 1 and 2 may be formed in a curved surface, or as illustrated in FIGS. 1A and 1B, curved surface portions R2 may be formed at both corner portions facing each other, or as illustrated in FIGS. 2A and 2B, a curved surface portion R3 may also be formed at any one corner portion thereof.

Hereinafter, a display device 1 illustrated in FIGS. 1A and 1B is referred to as a first display device, a display device 2 illustrated in FIGS. 2A and 2B is referred to as a second display device.

As illustrated in FIGS. 1A and 1B, the curved surface portions R2 may be formed at opposite corner portions of the first display device 1. A flat surface portion R1 may be provided at a center portion of the first display device 1 positioned between the curved surface portions R2. The curved surface portions R2 of the first display device 1 may be formed to have a varying curvature. Each of the curved surface portions R2 may also be a part of a circumference having the same central point O.

Unlike FIGS. 1A and 1B, the entire first display device 1 may also be formed in a curved surface. The curved surface may be formed such that opposite corner portions of the first display device 1 are formed in a backward direction of the first display device 1. Here, curvatures of the corner portions R2 and the center portion R1 may be differently provided. Hereinafter, an embodiment in which each of the corner portions R2 of the first display device 1 is formed to have a curved surface and the central portion thereof is formed to have the flat surface portion R1 will be described.

The second display device 2 may be provided to have the curved surface portion R3 at at least one corner portion thereof. The remaining portion which is not the curved surface portion R3 may be provided as a flat surface portion R4. The curved surface portion R3 provided in the second display device 2 may be formed to have a varying curvature or may also be a part of a circumference having the same central point O', similar to the curved surface portion R2 provided in the first display device 1.

When a direction corresponding to a portion at which an image is displayed is positioned is referred to as a forward direction on the display devices 1 and 2, and a direction corresponding to a rear surface of each of the display devices 1 and 2 is positioned is referred to as a backward direction, a corner of the curved surface portion R2 formed in the first display device 1 and a corner of the curved surface portion R3 formed in the second display device 2 may be formed in a backward direction.

A main image may be displayed on the flat surface portions R1 and R4 of the first display device 1 and the second display device 2, and an auxiliary image may be displayed on the curved surface portions R2 and R3. For example, a moving image is displayed on the flat surface portions R1 and R4, and various icons, alarms, and the like may be displayed on the curved surface portions R2 and R3.

Although the embodiment in which the curved surface portions R2 and R3 are respectively formed at the corner portions of the display devices 1 and 2 are described in the above description, a curved surface portion may also be formed at a central portion of the display device. However, a curvature center of the curved surface portion may be positioned at a backward direction of the display device. The curvature of the curved surface portion may also be provided to vary.

Cover windows 10 and 20 may be positioned in the front of the display devices 1 and 2, and various substrates 11 and 21 may be provided on rear surfaces of the cover windows 10 and 20 by being laminated in order. The substrates laminated on the rear surfaces of the cover windows 10 and 20 may include a display panel, a touch sensor panel, a printed circuit board (PCB) panel, and the like. Such substrates may adhere to the rear surfaces of the cover windows 10 and 20 by a transparent adhesive member.

When the curved surface portion is formed such that the corner portion of the display device faces in a forward direction, a substrate may easily adhere to the rear surface of the cover window including the curved surface portion by an adhesive member. For example, after the adhesive member is positioned at the rear surface of the cover window or at any one surface of the substrate, the substrate is positioned at the rear surface of the cover window, the substrate is pressed by an interference member such as a roller, and thus, the substrate may adhere to the rear surface of the cover window.

In a case in which the curved surface portion is formed such that the corner portion of the display device faces in a backward direction, the substrate has to be inserted into and adhere to the curved surface portion of the cover window when the substrate adheres to the rear surface of the cover window including the curved surface portion. Accordingly, an adhesive member positioned at one surface of the substrate may be swept by a corner of the curved surface portion of the cover window when the substrate is inserted into the curved surface portion of the cover window. In addition, bubbles may be generated between the cover window and the substrate when the substrate is not pressed by the interference member due to a curvature of the cover window.

In addition, so as to prevent the adhesive member provided on the substrate from being swept by the curved surface portion of the cover window, after opposite corners of the substrate are fixed to a holder and are bent not to be in contact with the curved surface portion of the cover window, the substrate may be laminated on the rear surface of the cover window. In this case, the adhesive member positioned on the substrate may be swept by the holder. In addition, when the holder moves away from the substrate such that the substrate adheres to the rear surface of the curved surface portion of the cover window, a corner of the substrate may collide with the cover window due to a reaction force of the bent substrate, and the adhesive member may also be swept, or bubbles may also be generated between the substrate and the cover window.

As described above, when corner portions of the curved surface portions R2 and R3 of the display devices 1 and 2 are curved in a backward direction, it is not easy to laminate the substrates 11 and 21 to the rear surfaces of the cover windows 10 and 20 without damage. According to one embodiment of the present disclosure, the substrates 11 and 21 may be laminated to the rear surfaces of the cover windows 10 and 20 not to generate sweep phenomena or bubbles of the adhesive member.

Hereinafter, a structure and a method of laminating the substrate 11 on the rear surface of the first display device 1 will be described.

Figure 3:
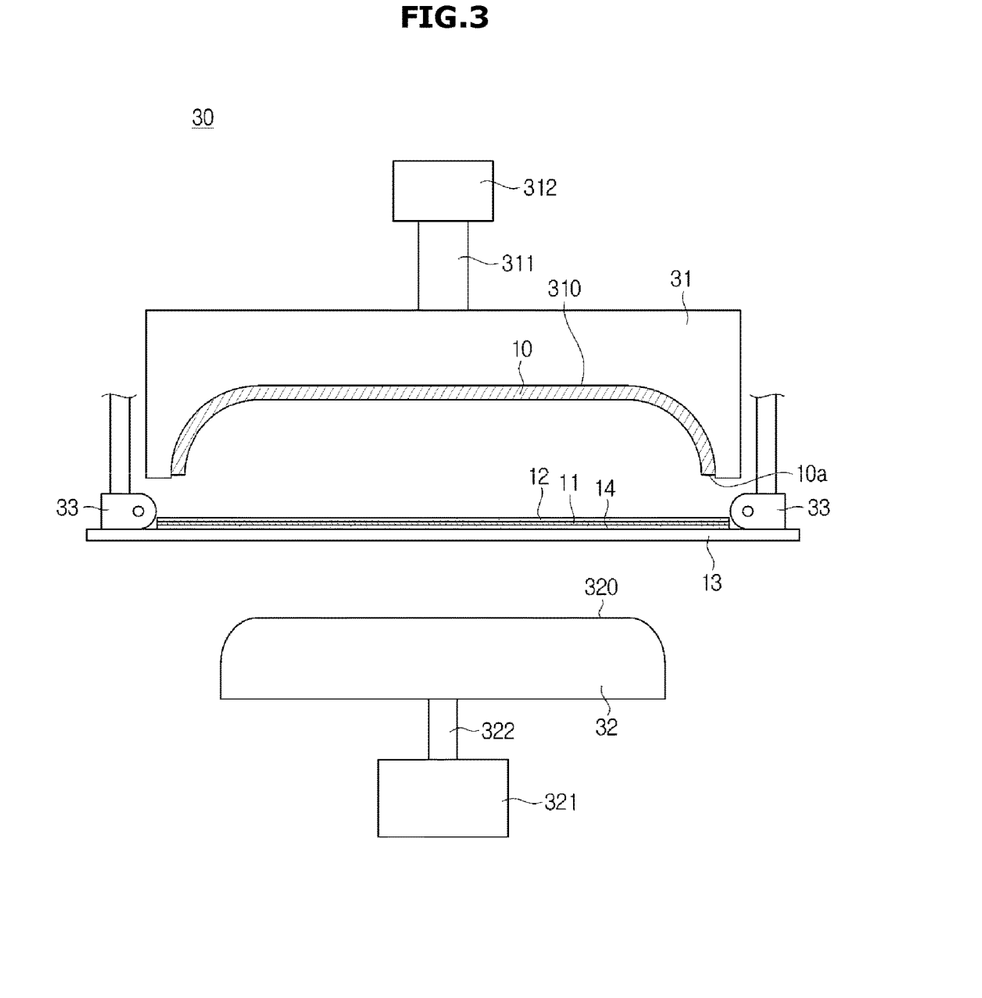
FIG. 3 is a view illustrating a lamination apparatus according to one embodiment of the present disclosure.
Figure 4:
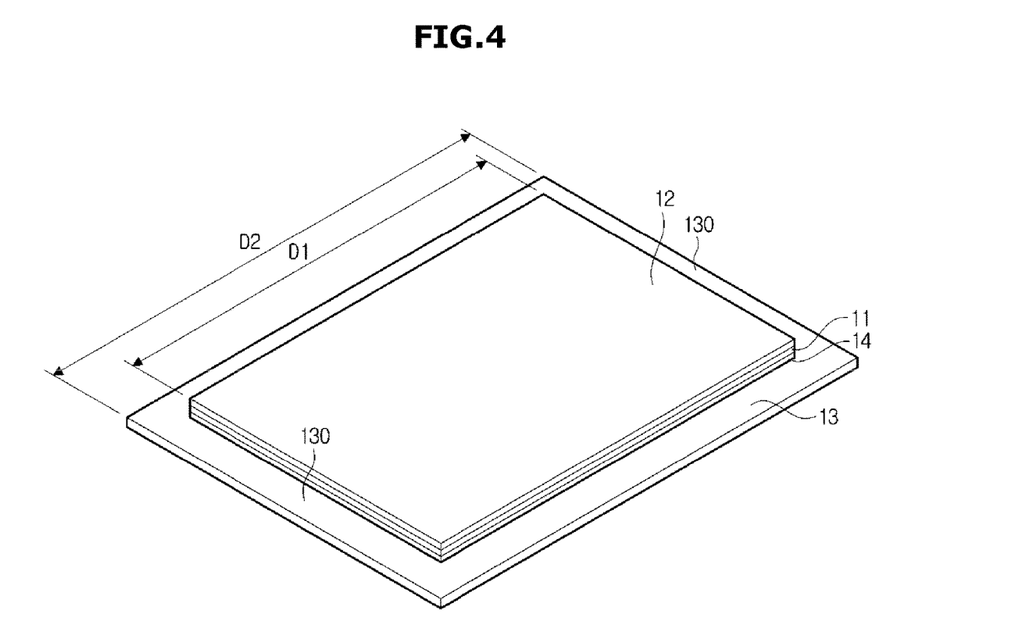
FIG. 4 is a view illustrating a substrate and a lamination film according to one embodiment of the present disclosure.

FIG. 3 is a view illustrating a lamination apparatus according to one embodiment of the present disclosure, and FIG. 4 is a view illustrating a substrate and a lamination film according to one embodiment of the present disclosure.

Referring to FIGS. 3 and 4, a lamination apparatus 30 according to one embodiment of the present disclosure includes a first jig 31 which fixes the cover window 10 and a second jig 32 which is disposed to face the first jig 31 and on which the substrate 11 is seated. The substrate 11 may include a display panel, a touch sensor panel, and the like. The display panel, the touch sensor panel, and the like may be mounted on a rear surface of the cover window 10 one by one in order, or a panel assembly in which a display panel, a touch sensor panel, and the like are laminated may also be mounted on the rear surface of the cover window 10.

The cover window 10 may be formed of a glass material or a plastic material. The cover window 10 may be formed such that opposite sides of the cover window 10 face in a backward direction. The substrate 11 may be flexibly provided to be bent by an external force.

A seating surface 310 having a shape corresponding to an outer surface of the cover window 10 may be formed on the first jig 31. The cover window 10 may be fixed to the seating surface 310. The cover window 10 is fixed to the seating surface 310 by an adhesive member, or the cover window 10 may also be fixed to the seating surface 310 by a suction device. The method of the cover window 10 being fixed to the seating surface 310 is not limited to the above-described method.

The first jig 31 may be connected to a driving portion 312 which drives the first jig 31. The driving portion 312 may be connected to the first jig 31 through a connection portion 311. The first jig 31 may move upward or downward by receiving a driving force from the driving portion 312.

A top surface of the second jig 32 may be provided to correspond to a shape of an inner surface of the cover window 10. The substrate 11 may be seated on the second jig 32. The substrate 11 is mounted on a guide member 13 to be seated on the second jig 32. The guide member 13 may be provided to have an area greater than that of the substrate 11. A width D2 in one direction of the guide member 13 may be greater than a width D1 in the one direction of the substrate 11.

A first adhesion layer 12 for adhering to the cover window 10 may be provided on a top surface of the substrate 11. A second adhesion layer 14 for adhering to the guide member 13 may be provided on a bottom surface of the substrate 11. The first adhesion layer 12 or the second adhesion layer 14 may be provided by being coated with an adhesive or a double sided tape being attached. The first adhesion layer 12 may be formed of a transparent material. The first adhesion layer 12 and the second adhesion layer 14 may be formed to have an area similar to that of the substrate 11.

After the substrate 11 adheres to the guide member 13, the guide member 13 may be seated on the second jig 32. Here, the substrate 11 may be positioned above the guide member 13.

A driving portion 321 may be connected to the second jig 32. The driving portion 321 may be connected to the second jig 32 through a connection portion 322. The second jig 32 may move upward or downward by receiving a driving force from the driving portion 321.

At least one of the first jig 31 and the second jig 32 may be formed of an elastic material. At least one of the first jig 31 and the second jig 32 may be formed of a rigid material. For one example, the first jig 31 may be formed of a rigid metallic material or synthetic resin, and the second jig 32 may be formed of an elastic material such as a silicone and rubber.

For another example, the first jig 31 and the second jig 32 may be formed of a rigid metallic material or synthetic resin, and an elastic pad (not shown) which is formed of an elastic material may also be provided on a top surface 320 of the second jig 32. As described above, as the elastic pad is provided on the top surface 320 of the second jig 32, when the substrate 11 and the cover window 10 are pressed against each other to come into close contact with each other, a pressure applied to the substrate 11 may be distributed uniformly.

The lamination apparatus 30 may further include an interference member 33. The interference member 33 is provided to press the guide member 13. Since the width D2 in one direction of the guide member 13 is provided to be greater than the width D1 in the one direction of the substrate 11 mounted on the guide member 13, the interference member 33 may press the guide member 13 having a width greater than that of the substrate 11.

The interference member 33 may be positioned to press opposite sides of the guide member 13. In a state of being seated on the second jig 32, when the guide member 13 is pressed by the interference member 33, central portions of the guide member 13 and the substrate 11 mounted on the guide member 13 may be bent to be convex upward by the second jig 32.

Figure 5:
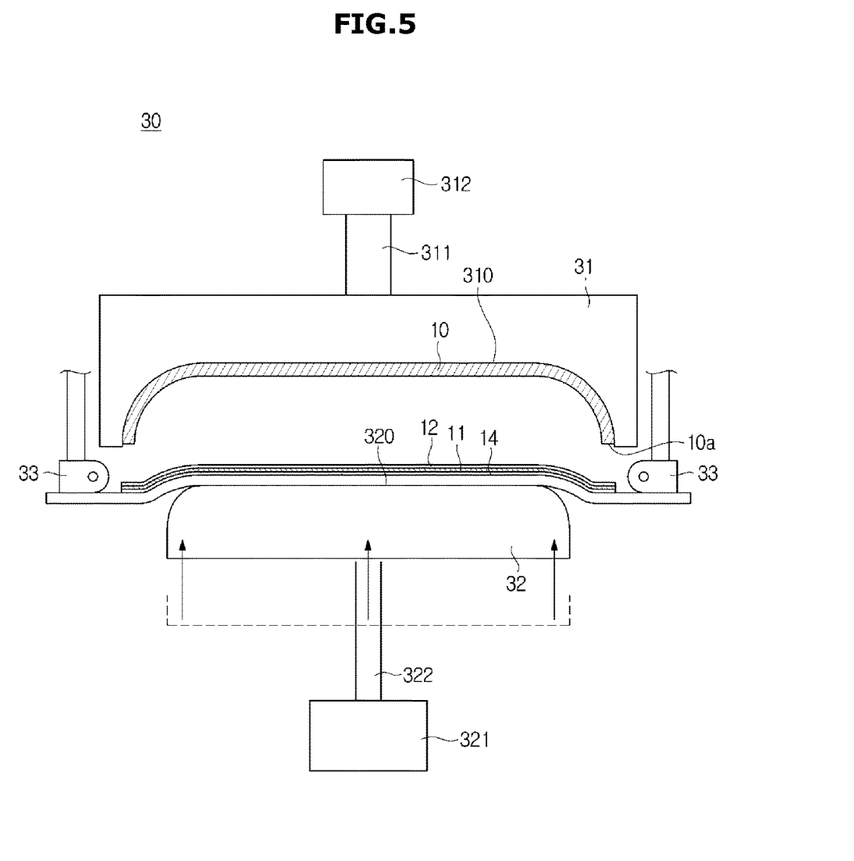
FIG. 5 is a view illustrating a case in which a first jig and a second jig of the lamination apparatus approach each other according to one embodiment of the present disclosure.

FIG. 5 is a view illustrating a case in which a first jig and a second jig of the lamination apparatus approach each other according to one embodiment of the present disclosure.

Referring to FIG. 5, the first jig 31 according to one embodiment of the present disclosure may be lowered by the driving portion 312, the second jig 32 may be raised by the driving portion 321, and thus the first jig 31 and the second jig 32 may approach each other. When the second jig 32 is raised, a central portion of the guide member 13 coming in contact with the second jig 32 may be raised together with the second jig 32. Front surfaces 130 (see FIG. 4) positioned at opposite sides of the guide member 13 may be pressed by the interference member 33.

Although the embodiment in which the first jig 31 is lowered and the second jig 32 is raised is described in the above description, any one of the first jig 31 and the second jig 32 may be driven. For example, it may also be possible that the second jig 32 is not driven and the first jig 31 is lowered, or the first jig 31 is not driven and the second jig 32 is raised. Hereinafter, an embodiment in which the first jig 31 is lowered and the second jig 32 is raised will be described.

Accordingly, the central portion of the guide member 13 is raised to an upper side at which the first jig 31 is positioned, and the opposite sides are not raised by interference of the interference member 33. Accordingly, the central portion of the guide member 13 may be convexly bent upward. As the guide member 13 is convexly bent upward, the substrate 11 mounted on the guide member 13 may also be convexly bent upward to correspond to a shape of the guide member 13.

The substrate 11 may be bent by the guide member 13 to form a curvature greater than that of the curved surface portion R2 of the cover window 10. As the substrate 11 is bent to form a curvature greater than that of the curved surface portion R2 of the cover window 10, a corner 10a of the curved surface portion R2 of the cover window 10 may not interfere with the substrate 11 when the substrate 11 approaches the rear surface of the cover window 10. Accordingly, the first adhesion layer 12 is prevented from being swept by the corner 10a of the cover window 10 while the substrate 11 is approaching the cover window 10.

Figure 6:
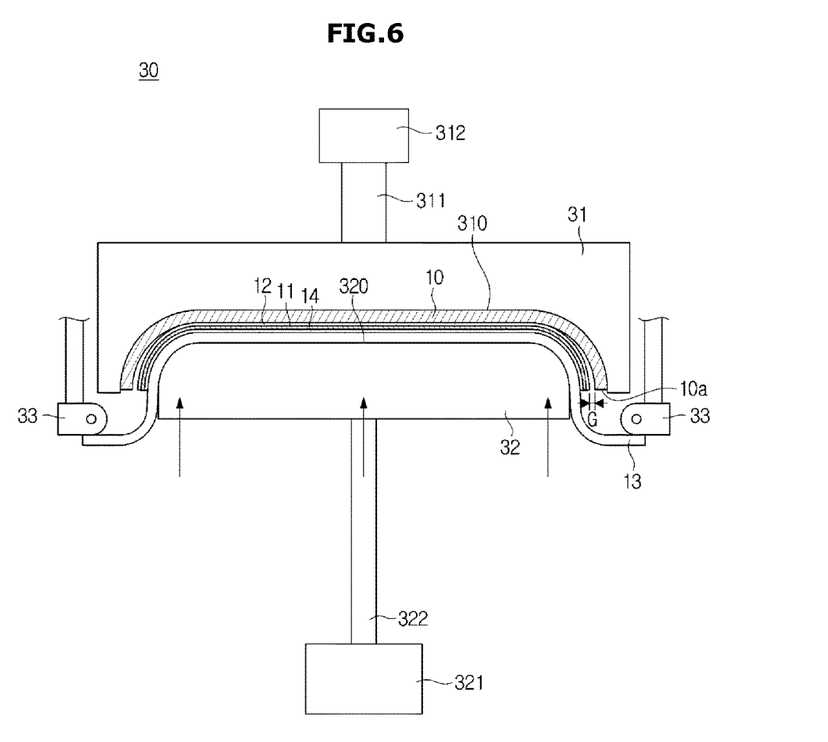
FIG. 6 is a view illustrating a case in which a cover window and the substrate are adhered to each other by the lamination apparatus according to one embodiment of the present disclosure.

FIG. 6 is a view illustrating a case in which a cover window and the substrate are adhered to each other by the lamination apparatus according to one embodiment of the present disclosure.

Referring to FIG. 6, as the first jig 31 according to one embodiment of the present disclosure is lowered and the second jig 32 is raised, the substrate 11 may be in contact with the rear surface of the cover window 10. Since the both sides of the guide member 13 were pressed by the interference member 33 and a corner of the substrate 11 was also bent to correspond to the guide member 13, the central portion of the substrate 11 positioned above the second jig 32 may be in contact with the rear surface of the cover window 10 in advance. In a state in which the guide member 13 is pressed by the interference member 33, the central portion of the substrate 11 may be in contact with a central portion of the cover window 10, and a gap G may exist between the corner of the substrate 11 and the corner 10a of the cover window 10.

Figure 7:
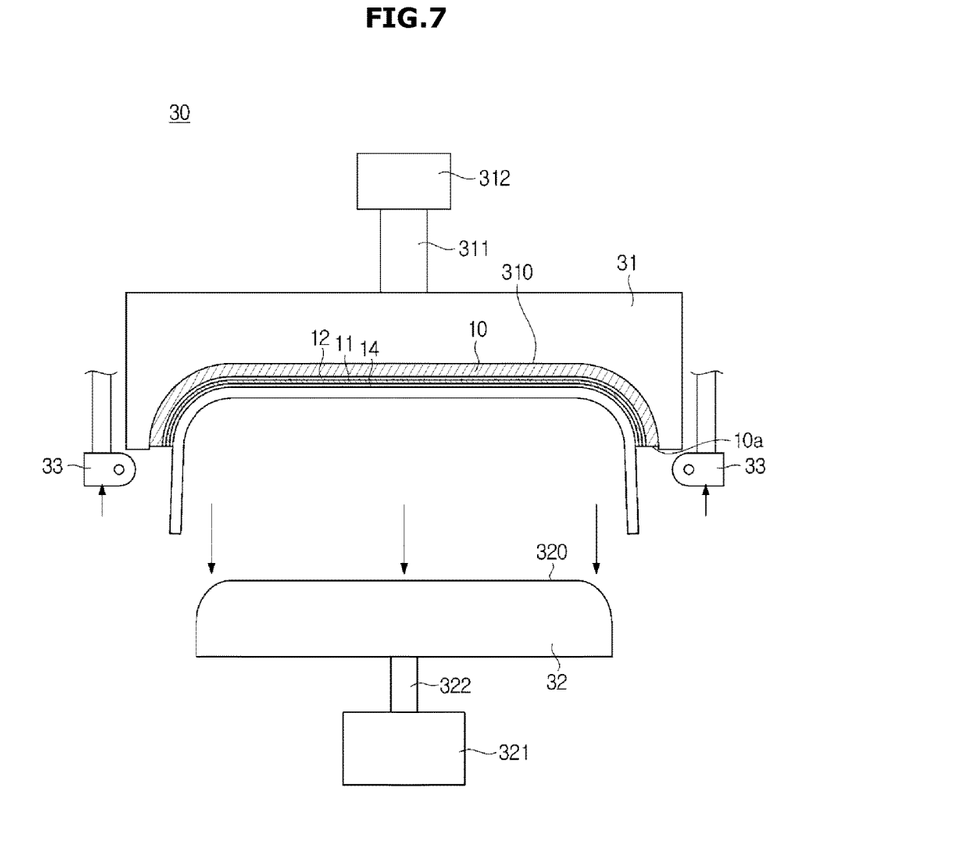
FIG. 7 is a view illustrating a case in which an interference member of the lamination apparatus moves away from a guide member according to one embodiment of the present disclosure.

FIG. 7 is a view illustrating a case in which an interference member of the lamination apparatus moves away from a guide member according to one embodiment of the present disclosure.

Referring to FIG. 7, after the central portion of the substrate 11 according to one embodiment of the present disclosure comes into contact with the central portion of the cover window 10, the interference member 33 of the lamination apparatus 30 may be separated from the guide member 13. When the interference member 33 is separated from the guide member 13, an external force applied to the sides of the guide member 13 may be removed. When the external force applied to the sides of the guide member 13 is removed, the corner portion of the substrate 11 may be moved upward together with the guide member 13. The substrate 11 may be provided to correspond to a shape of the inner surface of the cover window 10 to come into close contact with the rear surface of the cover window 10.

As described above, when the substrate 11 approaches the cover window 10, the substrate 11 may be bent to prevent the corner 10a of the cover window 10 from interfering with the substrate, a part of the substrate 11 may come into contact with the cover window 10, an external force applied to the guide member 13 may be removed, and thus the substrate 11 may completely come into close contact with the cover window 10. Since the substrate 11 is not directly bent by the interference member 33, sweep phenomena of the first adhesion layer 12 by the interference member 33 may be prevented. As the corner portion of the substrate 11 is unbent to come into close contact with the cover window 10 after the central portion of the substrate 11 is in contact with the central portion of the cover window 10, the substrate 11 may be correctly mounted on the rear surface of the cover window 10 without generating bubbles.

When the substrate 11 comes into close contact with the rear surface of the cover window 10, the first jig 31 may be lowered and the second jig 32 may be raised such that the substrate 11 adheres to the rear surface of the cover window 10. Here, one of the first jig 31 and the second jig 32 may be formed of an elastic material such that a uniform pressure may be applied to an entire area of the substrate 11 and the cover window 10.

Figure 8:
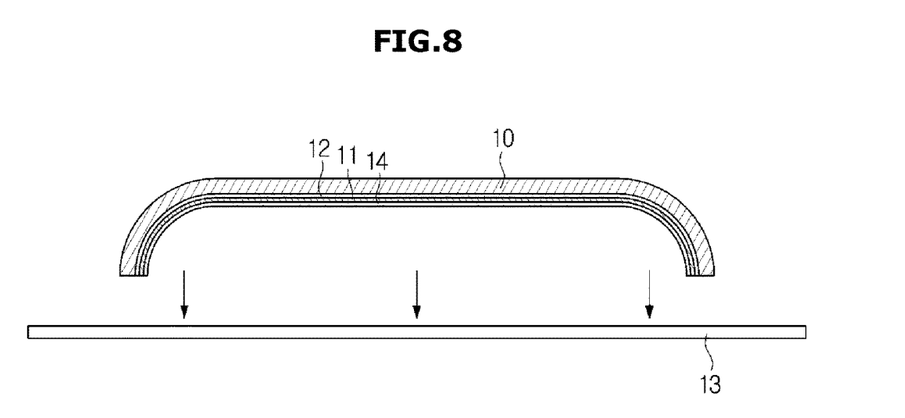
FIG. 8 is a view illustrating a case in which the guide member is separated from the substrate according to one embodiment of the present disclosure.

FIG. 8 is a view illustrating a case in which the guide member is separated from the substrate according to one embodiment of the present disclosure.

Referring to FIG. 8, after the substrate 11 adheres to the rear surface of the cover window 10, the guide member 13 may be spaced apart from the substrate 11. The second adhesion layer 14 may be manufactured of a material allowing the guide member 13 to be easily separated from the substrate 11. For example, the second adhesion layer 14 may be dissolved in a specific solution which dissolves the second adhesion layer 14.

As described above, the guide member 13 may perform a function of assisting the substrate 11 to correctly come into close contact with the rear surface of the cover window 10, and may be removed after the substrate 11 adheres to the rear surface of the cover window 10.

Figure 9:
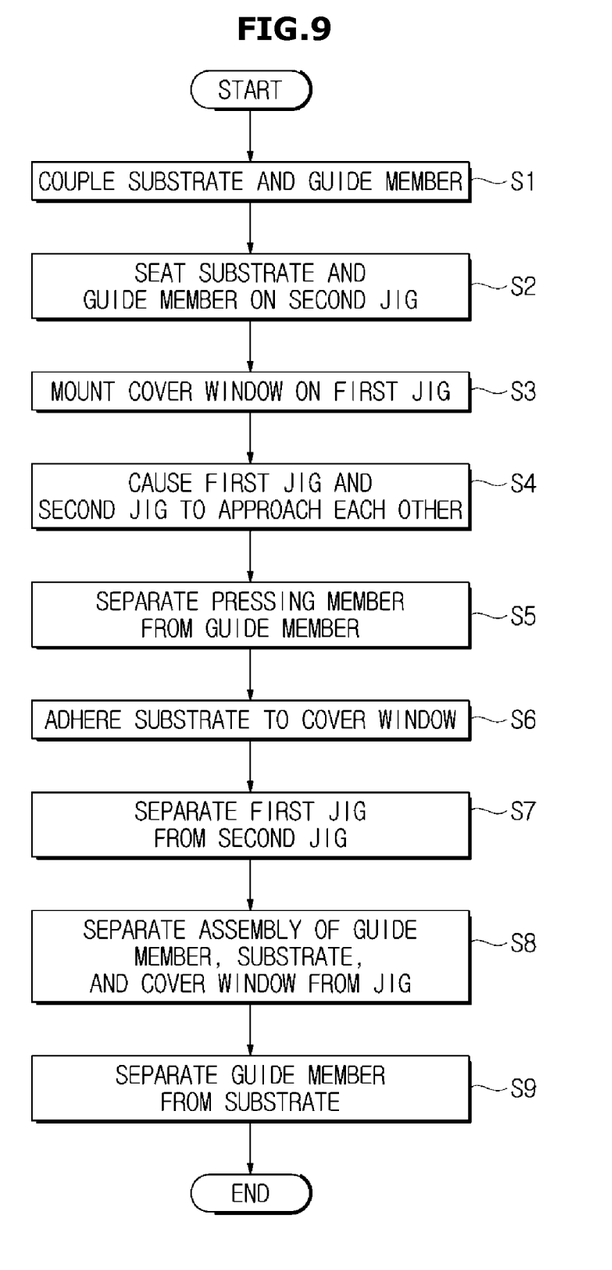
FIG. 9 is a flowchart which shows a lamination method using the lamination apparatus according to one embodiment of the present disclosure.

FIG. 9 is a flowchart which shows a lamination method using the lamination apparatus according to one embodiment of the present disclosure.

Referring to FIG. 9, first, the substrate 11 is coupled to the guide member 13 such that the substrate 11 according to one embodiment of the present disclosure adheres to the cover window 10 (S1). The substrate 11 and the guide member 13 may adhere to each other by the adhesion layer 14 capable of dissolving in a specific solution. The width of the guide member 13 may be greater than that of the substrate 11.

After the substrate 11 adheres to the guide member 13, an adhesion layer may be positioned at a front surface of the substrate 11. The adhesion layer positioned at the front surface of the substrate 11 is provided such that the substrate 11 adheres to the rear surface of the cover window 10. The adhesion layer may include a transparent adhesive, a transparent adhesive tape, and the like.

After the adhesion layer is positioned at the front surface of the substrate 11, the guide member 13 to which the substrate 11 adheres may be seated on the second jig 32 (S2). The cover window 10 may be mounted on the first jig 31 (S3). The process in which the guide member 13 is seated on the second jig 32 (S2) and the process in which the cover window 10 is mounted on the first jig 31 (S3) may be performed in reverse order.

After the cover window 10 is mounted on the first jig 31 and the guide member 13 is seated on the second jig 32, the first jig 31 and the second jig 32 may approach each other. For example, the first jig 31 may be lowered to a lower side at which the second jig 32 is positioned and the second jig 32 may be raised to an upper side at which the first jig 31 is positioned.

Here, the front surfaces 130 positioned at sides of the guide member 13 may be pressed by the interference member 33 and the guide member 13 may be bent. The substrate 11 may also be bent together with the guide member 13 to correspond to the guide member 13. The substrate 11 may approach the rear surface of the cover window 10 in a state in which the substrate 11 is bent to prevent the corner of the cover window 10 from interfering with the substrate 11. In a state in which the front surfaces 130 positioned at the sides of the guide member 13 are pressed by the interference member 33, the central portion of the substrate 11 may come into contact with the central portion of the cover window 10 first.

After the central portion of the substrate 11 comes into contact with the central portion of the cover window 10, the interference member 33 may be separated from the guide member 13. When the guide member 13 is released from a pressed state, the bending of the guide member 13 and the substrate 11 may be released, and the substrate 11 may completely come into close contact with the rear surface of the cover window 10.

After the substrate 11 completely comes into close contact with the rear surface of the cover window 10, the substrate 11 and the cover window 10 may adhere to each other (S6). The first jig 31 may be lowered and the second jig 32 may be raised to press such that the substrate 11 the rear surface of the cover window 10 may adhere to each other.

After the substrate 11 adheres to the rear surface of the cover window 10, the first jig 31 and the second jig 32 may be separated from each other (S7).

After the first jig 31 and the second jig 32 are separated from each other, the module in which the cover window 10, the substrate 11, and the guide member 13 adhere to each other may be separated from the jigs 31 and 32 (S8). In a state in which the cover window 10 and the substrate 11 adhere to each other, the guide member 13 may be separated from a rear surface of the substrate 11 (S9). As described above, the guide member 13 may serve to guide such that the substrate 11 correctly adheres to the rear surface of the cover window 10, and then may be removed.

According to the lamination apparatus and the lamination method using the same of the present disclosure, the substrate 11 may correctly adhere to the rear surface of the cover window 10 without generating bubbles or sweep phenomena of the adhesive member. The lamination apparatus according to the present disclosure may be positioned in a vacuum chamber. After the lamination apparatus, the cover window, the substrate, and the like are positioned in the vacuum chamber, the inside of the vacuum chamber becomes a vacuum state by a vacuum pump and lamination may be performed.

Although the embodiment regarding the first display device 1 illustrated in FIGS. 1A and 1B has been described in FIGS. 3 to 9, the lamination apparatus and the lamination method may also be similarly applied to the second display device 2. The lamination apparatus and the lamination method using the same may also be similarly applied to any type of display devices in which a corner thereof is bent in a backward direction as well as the first display device 1 and the second display device 2.

In addition, although the embodiment in which the corner side thereof is bent such that the corner portion faces in a backward direction has been described in the above description, the lamination apparatus and the lamination method using the same may also be similarly applied to a case in which a central portion of a display device convexly curves in a forward direction and a corner side thereof is formed to have a flat surface.

As is apparent from the above description, in the lamination apparatus and the lamination method using the same according to one aspect of the present disclosure, the cover window and the substrate in which at least a part thereof is formed to have a curved surface can be laminated without damage of the exterior.

In addition, although the curvature of the cover window varies, the substrates can be easily laminated on the rear surface of the cover window.

In addition, generation of bubbles between the cover window and the substrate or sweep of an adhesion means can be prevented.

In addition, when laminating, as the substrate is not directly pressed, damage of the substrate can be prevented.

Although a few embodiments of the present disclosure have been shown and described, it would be appreciated by those skilled in the art that changes may be made in these embodiments without departing from the principles and spirit of the invention, the scope of which is defined in the claims and their equivalents.

What is claimed is:

1. A lamination apparatus comprising:
   a guide member, on which a substrate is mountable, the guide member having a width greater than a width of the substrate and bendable;
   a first jig on which a cover window is mountable, wherein the cover window includes:
      a rear surface on which the substrate is positioned, and
      a curved surface portion which curvature center is positioned behind the rear surface of the curved surface portion;
   a second jig to seat the guide member thereon; and
   an interference member to interfere with the guide member while the first jig and the second jig approach each other,
   wherein the interference member bends the guide member when the first jig and second jig approach each other, and is separated from the guide member before the substrate is attached to a read surface of the curved surface portion of the cover window.

2. The lamination apparatus of claim 1, wherein, as the guide member is being bent, the substrate is being bent together with the guide member.

3. The lamination apparatus of claim 2, wherein the substrate is bent to have a curvature angle greater than a curvature angle of the curved surface portion to prevent the curved surface portion of the cover window from interfering with the substrate.

4. The lamination apparatus of claim 2, wherein the second jig approaches the first jig such that the interference member interferes with the guide member.

5. The lamination apparatus of claim 4, wherein the interference member moves away from the guide member when the substrate comes in contact with a rear surface of the cover window.

6. The lamination apparatus of claim 5, wherein the entire substrate comes into close contact with the rear surface of the cover window when the interference member moves away from the guide member.

7. The lamination apparatus of claim 5, wherein the first jig and the second jig allow the substrate to adhere to a surface of the cover window.

8. The lamination apparatus of claim 1, wherein a seating surface corresponding to a front outer surface of the cover window is formed at the first jig.

9. The lamination apparatus of claim 1, wherein one surface of the second jig is formed to correspond to a shape of an inner surface of the cover window.

10. The lamination apparatus of claim 1, wherein the first jig is provided to be lowered by a driving portion.

11. The lamination apparatus of claim 1, wherein the second jig is provided to be raised by a driving portion.

* * * * *